United States Patent [19]

Thorman

[11] Patent Number: 5,391,356
[45] Date of Patent: Feb. 21, 1995

[54] FLOW DISTRIBUTOR FOR A FLUIDIZED BED REACTOR

[75] Inventor: Raymond P. Thorman, Mahwah, N.J.

[73] Assignee: International Paper Company, Purchase, N.Y.

[21] Appl. No.: 37,264

[22] Filed: Mar. 26, 1993

[51] Int. Cl.⁶ .............................. B01J 8/18; B01J 8/44
[52] U.S. Cl. .................................... 422/143; 34/582; 34/585; 239/553.3
[58] Field of Search ............... 422/143, 139, 310, 311; 110/245, 263; 122/4 D; 431/170; 34/57 A, 582, 583, 585, 576; 239/553.3, 553.5, 557

[56] References Cited

U.S. PATENT DOCUMENTS

| | | | |
|---|---|---|---|
| 2,823,075 | 2/1958 | Shirley | 239/553.3 |
| 2,856,264 | 10/1958 | Dunn | 34/57 A |
| 2,892,262 | 6/1959 | Shirk | 34/57 |
| 3,040,439 | 6/1962 | Frost | 422/143 |
| 3,298,793 | 1/1967 | Mallison et al. | 422/143 |
| 3,404,845 | 10/1968 | Schmeling et al. | 239/553.5 |
| 3,508,341 | 4/1970 | Price | 422/143 |
| 3,672,577 | 6/1972 | Kramer | 422/143 |
| 3,711,593 | 1/1973 | Shick | 423/207 |
| 3,921,663 | 11/1975 | Beranck | 137/533.11 |
| 3,974,091 | 8/1976 | Parker et al. | 252/417 |
| 4,062,656 | 12/1977 | Blaser | 422/143 |
| 4,171,945 | 10/1979 | Lazenby | 110/245 |
| 4,223,843 | 9/1980 | Smith et al. | 239/567 |
| 4,303,469 | 12/1981 | DiNovo et al. | 162/30 |
| 4,443,551 | 4/1984 | Lionetti et al. | 422/143 |
| 4,532,108 | 7/1985 | Becht | 422/143 |
| 4,574,496 | 3/1986 | Sedlacek | 34/57 A |
| 4,619,732 | 10/1986 | Clay et al. | 162/30 |
| 4,714,591 | 12/1987 | Avedeslan | 422/140 |
| 4,764,347 | 8/1988 | Milligan | 422/113 |
| 4,779,547 | 10/1988 | Zugner | 34/57 A |
| 4,841,884 | 6/1989 | Engstrom et al. | 34/57 A |
| 4,931,401 | 6/1990 | Sofi | 422/143 |
| 5,026,269 | 6/1991 | Ruottu | 422/143 |
| 5,091,156 | 2/1992 | Ijas et al. | 422/200 |

FOREIGN PATENT DOCUMENTS

7304585 10/1973 Netherlands .
507759 4/1976 U.S.S.R. .

Primary Examiner—Peter Kratz
Attorney, Agent, or Firm—Luedeka, Neely & Graham

[57] ABSTRACT

The specification discloses a flow distributor for distributing a flow of fluid to a bed of particles in a fluidized bed reactor. The flow distributor comprises a plurality of spaced apart discharge conduits containing exit openings for distributing the flow of fluid into the bed of particles generally across the width of the reactor from a plurality of spaced apart locations. Flow diffusers are located in the conduits upstream of the exit openings to provide multiple, spaced apart, generally parallel, flow streams within the conduits which expand and merge together as they approach the exit openings to produce a merged flow stream extending substantially across the width of each conduit prior to discharge of the flow into the reactor. The multiple flow streams within the conduits expand the flow in the conduit more quickly than a single expanding flow stream from a single opening, so that the length of the conduit may be shortened while still providing full expansion of the flow across the width of the conduit to decrease the velocity of the fluid before the flow exits the tube into the reactor.

9 Claims, 5 Drawing Sheets

PRIOR ART

Fig. 8

FLOW DISTRIBUTOR FOR A FLUIDIZED BED REACTOR

The present invention relates to flow distribution devices. More particularly, the invention relates to a flow distributor for a fluidized bed reactor which provides improved flow delivery and distribution to the particle bed in the reactor.

Various fluid-solid contacting devices are known in the art. Fluid-solid catalytic reactors are a type of fluid-solid contacting device in which a fluid, such as a reagent gas, flows through catalyst particles or catalyst-coated particles. These are typically classified as either "fixed-bed" reactors where the fluid flows through a stationary catalyst bed, or "fluidized bed" reactors when the particles are suspended or "float" in the fluid due to the drag force imparted by the moving fluid.

Conventional fluidized bed reactors include a grid plate across the bottom of the reactor. The grid plate contains a plurality of openings and gas flows up into the bed from the openings in a plurality of high velocity jets. In this manner, the flow is more evenly distributed across the bed to avoid channeling of the flow and promote a high conversion efficiency. As a rule of thumb, the pressure drop across the distributor should be in the range of 10 to 30% of the pressure drop across the particle bed in order to assure even distribution of the flow.

Known grid plate designs tend to accelerate attrition of the particle bed due to the relatively high velocity of the jets issuing from the openings, which produce high speed collisions of particles at the bed/plate interface. Plate erosion is also accelerated due to the wear of particles on the plate similar to "sand blasting," particularly in high velocity beds. Reducing the velocity of the jets by using more or wider openings decreases the pressure drop across the distributor which tends to reintroduce undesirable flow variations across the bed.

Various attempts have been made to overcome problems of particle attrition and plate erosion. One approach is to expand the flow of the fluid from the openings within larger diameter shrouds or diffusion tubes so that the velocity is reduced before the gas reaches the bed. U.S. Pat. No. 3,298,793 to Mallison et al describes several diffusion tubes for this purpose. However, diffusion tubes of the type shown in the '793 patent are of limited usefulness in small diameter reactors or high velocity fluidized beds. They also tend to be relatively long, which is undesirable in many cases because of the extra space and material required to accommodate the length of the tubes. In addition, if the tubes or shrouds are of insufficient length, the tubes or shrouds are still susceptible to erosion with associated particle attrition, particularly at high gas velocities because the flow is not able to expand across the width of the tube before it reaches the exit opening. This produces low pressure areas adjacent the tube openings causing particles to be drawn into the opening, which are then propelled at high speed into the bed and against the tube wall.

Accordingly it is an object of the present invention to provide a flow distributor for a fluidized bed reactor.

Another object of the present invention is to provide a flow distributor of the character described which reduces particle and distributor attrition while providing an even distribution of flow into the bed to minimize channeling.

A further object of the present invention is to provide a flow distributor of the character described which is compact and is well-suited for use in reactors where space limitations do not readily accommodate the use of conventional flow distributors.

An additional object of the present invention is to provide a flow distributor of the character described which is well-suited for use in high velocity fluidized beds.

Still another object of the present invention is to provide a flow distributor of the character described which is uncomplicated in use and configuration.

Having regard to the foregoing and other objects, the present invention is directed to a flow distributor for delivering a flow of fluid to a bed of particles in a fluidized bed reactor. The flow distributor comprises a plurality of spaced apart elongate discharge conduits having exit openings for delivering the flow of fluid into the particle bed from a plurality of spaced apart locations spread generally across the width of the reactor. The flow distributor further includes structure for delivering a flow of fluid to the discharge conduits from a fluid source.

Diffusers are located in the discharge conduits at locations spaced upstream of the exit openings to produce multiple spaced apart generally parallel flow streams within the conduits. The flow steams expand and merge together as they approach the exit openings of the conduits to provide a merged flow stream extending substantially across the width of each conduit prior to discharge of the merged flow stream into the reactor.

Since the merged flow streams extend substantially across the width of the conduits before exiting the discharge openings, low pressure areas adjacent the discharged openings of the conduits are avoided to minimize bed attrition and erosion of the distributor. Also, the use of multiple flow streams from openings of a given total area advances the expansion of the flow downstream of the diffuser as compared with a single flow stream from a single opening of the same area so that the length of the conduit or tube downstream of the grid plate may be decreased, or, in the alternative, a higher velocity may be used for a given conduit length with the flow advantageously expanding across the width of the conduit before discharge into the reactor.

According to another aspect of the invention, a fluidized bed reactor is provided for contacting a flow of fluid from a fluid source with a bed of particles in a fluidized state. The reactor comprises a reaction vessel containing a bed of particles with an outlet for discharging fluid from the vessel and an inlet for connecting the reaction vessel to a source of fluid. A plurality of elongate discharge conduits are located within the reaction vessel and are connected in flow communication with the fluid source. Each conduit has an exit opening for discharging a flow of fluid into the reaction vessel and the conduits are arranged to deliver flow from the exit openings into the reaction vessel from spaced apart locations extending generally across the width of the vessel, preferably in a plane perpendicular to the flow of fluid through the bed of particles. Diffusers are located within the discharge conduits at locations spaced upstream of the exit openings and are configured to diffuse the flow into a plurality of spaced part generally parallel flow streams which expand and merge together as they approach the exit openings of the conduits to provide a merged flow stream which extends substantially across the width of the conduit prior to discharge of the merged flow stream from the exit opening into the vessel.

The above and other features and advantages of the present invention will become further known from the following detailed description when considered in conjunction with the accompanying drawings in which.

Figure 1:
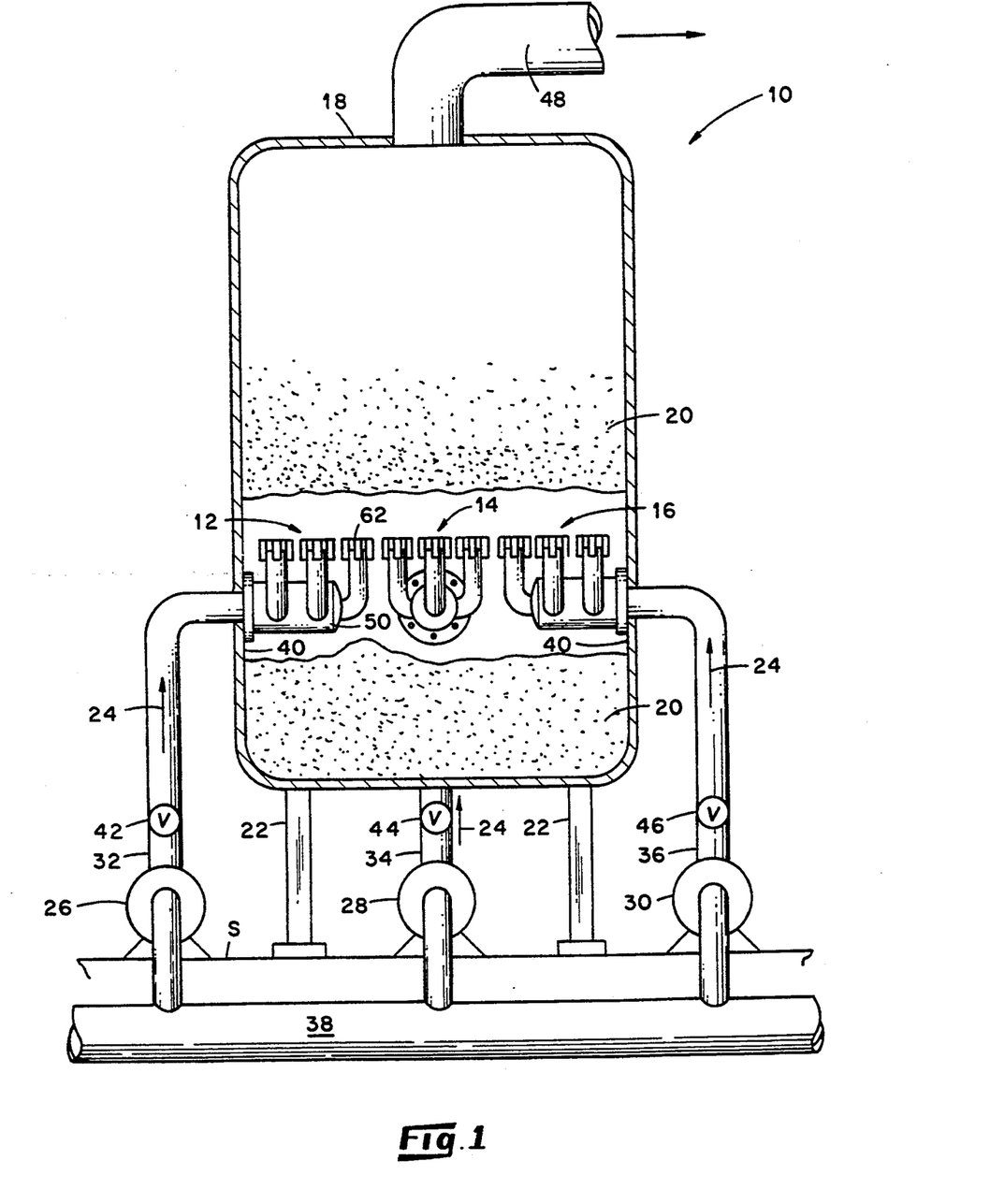
FIG. 1 is an elevational view, partially in section, of a fluidized bed reactor containing a plurality of flow distributors in accordance with an embodiment of the present invention.

With reference now to the drawings in which like reference characters designate like or similar parts throughout the several views, there is shown in FIG. 1 a fluidized-bed reactor 10 containing a plurality of flow distributor assemblies 12, 14 and 16 according to one embodiment of the invention. The reactor 10 of the illustrated embodiment includes an upright reaction vessel 18 having a cylindrical configuration and charged with a bed of particles 20 such as catalyst beads or pellets. The vessel 18 is supported above a support surface S by legs 22.

While the present invention is described in connection with this particular reactor and bed system, it will be understood that the embodiment is exemplary and the present invention may be used with all manner of fluidized reactor and bed systems through the full range of gas velocities and chemical constituents, and is also useful in processes involving chemical reactions, combustion, gasification, or drying.

With continuing reference to FIG. 1, a flow of fluid such as reagent gas indicated by arrows 24 is delivered as by pumps 26, 28, 30 and associated inlet conduits 32, 34, 36 from a source 38 to the distributor assemblies 12, 14 and 16, respectively. In the illustrated embodiment, the distributor assemblies 12, 14 and 16 are supported on an inner wall 40 of the vessel 18 at circumferentially spaced apart locations in a radially inwardly projecting manner for distribution of gas into the bed of particles 20.

Valves 42, 44 and 46 are located in the conduits 32, 34 and 36, respectively, for controlling the flow of gas to the distributor assemblies 12, 14, 16. An outlet or exhaust port 48 is located at the upper end of the vessel 18 for conducting gas out of the vessel after it passes through the bed of particles 20.

The reactor of FIG. 1 represents a preferred embodiment in which the distributor assemblies 12, 14 and 16 are substantially identical and are used to provide an array of substantially uniformly spaced apart locations from which the gas flow is emitted into the bed 20. For the sake of brevity, only the single distributor assembly 12 will be described in detail herein.

Figure 2:
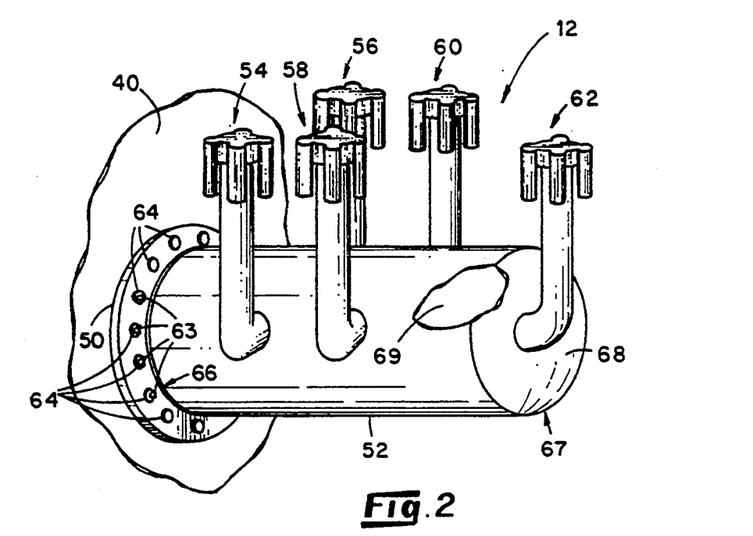
FIG. 2 is a perspective view of one of the flow distributors from the reactor in FIG. 1.
Figure 3:
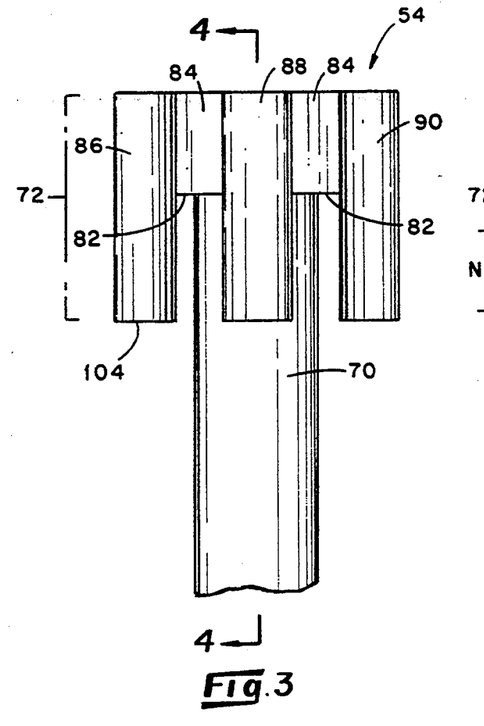
FIG. 3 is an elevational view of a portion of the flow distributor shown in FIG. 2.

Thus, with reference to FIG. 2, the distributor assembly 12 may include an annular flange 50, a header 52, and a plurality of distributors 54, 56, 58, 60 and 62. The distributor assembly 12 may be mounted to the inner wall 40 of the reaction vessel 18 adjacent the inlet conduit 32 by bolts 63 extending through openings 64 defined on the flange 50, which may have a saddle-shape to fit in conforming engagement with the inner curved wall of the vessel 18.

The header 52 is preferably provided by a hollow cylinder with its inboard end 66 integrally and sealably connected, as by welding, to the flange 50 so that an interior chamber 69 of the header 52 is in flow communication with the inlet conduit 32 and, thus, the source of fluid as supplied by pump 26. Accordingly, it will be understood that the inner diameter of the opening in the flange 50 may correspond to and mate with the open end of the header 52 on its inboard end 66. The outboard end 67 of the header 52 is closed as by a circular cap 68 welded or otherwise sealably fastened over the open end of the cylinder.

Each distributor 54, 56, 58, 60 and 62 is connected in flow communication with the interior chamber 69 of the header 52 and is disposed above the header at about the level as the others so that they all lie generally in a plane extending across the vessel 18, which plane is oriented generally perpendicular to the flow of fluid through the bed 20.

Turning to FIGS. 3, 4, 5, 6, the distributor 54 will now be described in detail, it being understood that the description is applicable to the others which are preferably although not necessarily of the same basic configuration. Thus, the distributor 54 includes a riser 70 with an overlying tube array 72 which defines a plenum 74 into which fluid passes from the riser 70.

The riser 70 is provided by an upright open-ended tube or pipe section having an upper open end 76 which corresponds in diameter to and is welded or otherwise sealably connected to a lower opening 78 of the tube array 72, and a lower open end 77 welded or otherwise sealably connected to a wall of the header 52 to provide flow communication between the plenum 74 and the interior chamber 69 of the header. The plenum 74 of the tube array 72 provides a disc-shaped open area between the lower opening 78 and a top surface 80, bottom 82 and side 84 of the assembly.

The tube array 72 further includes circumferentially arranged discharge tubes 86, 88, 90 and 92 and each discharge tube includes a grid plate 94, 96, 98 and 100, respectively, located inside the tube. In the illustrated embodiment, the tubes 86, 88, 90 and 92 are after the fashion of elongate downwardly opening cylinders connected, as by welding, to the side wall 84 of tube array 72 and are in flow communication with the plenum chamber 72 therein for receiving a flow of the reagent gas from the chamber and directing it downwardly into the lower area of the vessel 18. For example, with reference to FIGS. 4 and 5, the discharge tube 86 may be welded to the exterior of the tube array 72 in a c-shaped cutout section 102 (shown in phantom) dimensioned to receive the curved sidewall of the upper end tube of the tube 86, which is closed across its top end. A corresponding c-shaped inlet opening 103 (shown in phantom) in tube 86 defines a mating inlet overlaying cutout 102, so that reagent gas is received into the tube from the plenum 74. Discharge tube 86 has an outlet or exit flow opening 104 spaced from the inlet opening 103 for directing flow from plenum 74 into the interior of the vessel 18.

Figure 7:
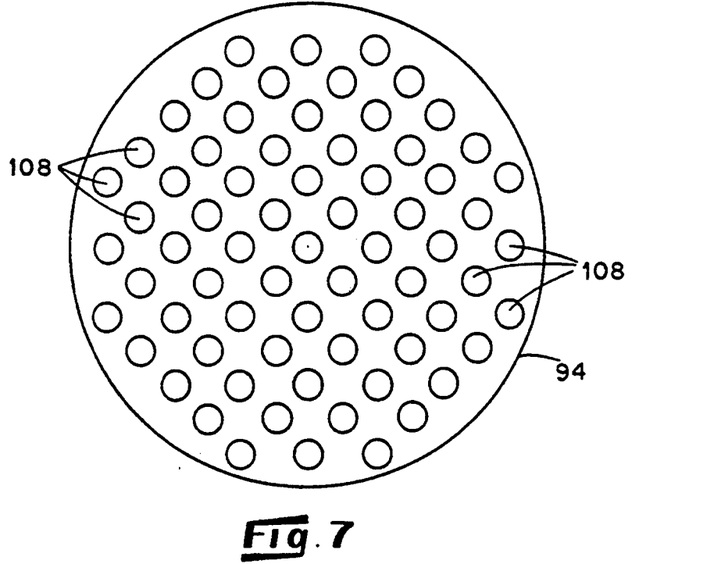
FIG. 7 is a top plan view of a grid plate for use in a flow distributor in accordance with the present invention.

The grid plate 94 associated with tube 86 is shown in detail in FIG. 7, and is positioned across tube 86 between the inlet opening 103 and the exit flow opening 104. The grid plate 94 is spaced up into the tube 86 upstream of the exit opening 104 a distance N, which may vary depending on the inside diameter of the tube and the flow velocity, as will be described further hereafter. A plurality of openings 108 are provided in grid plate 94, which is disposed substantially perpendicular to the direction of flow in the tube 86 and attached to the inside wall of the tube in a suitable manner as by welding.

Figure 4:
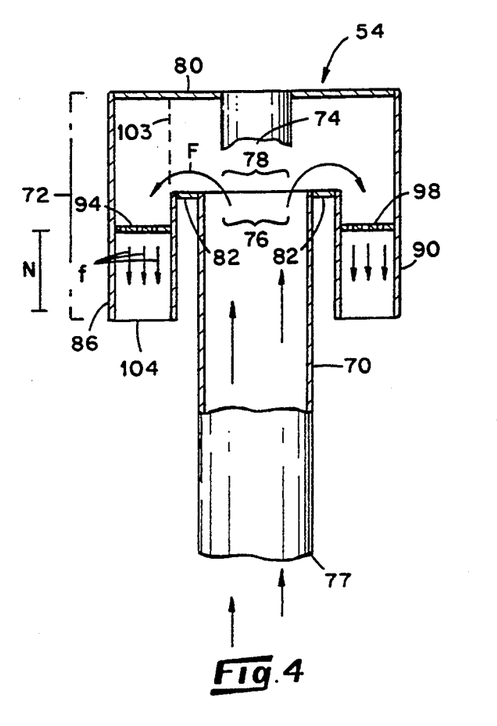
FIG. 4 is a view, partially in section, of the apparatus of FIG. 3 taken along line 4—4.
Figure 4A:
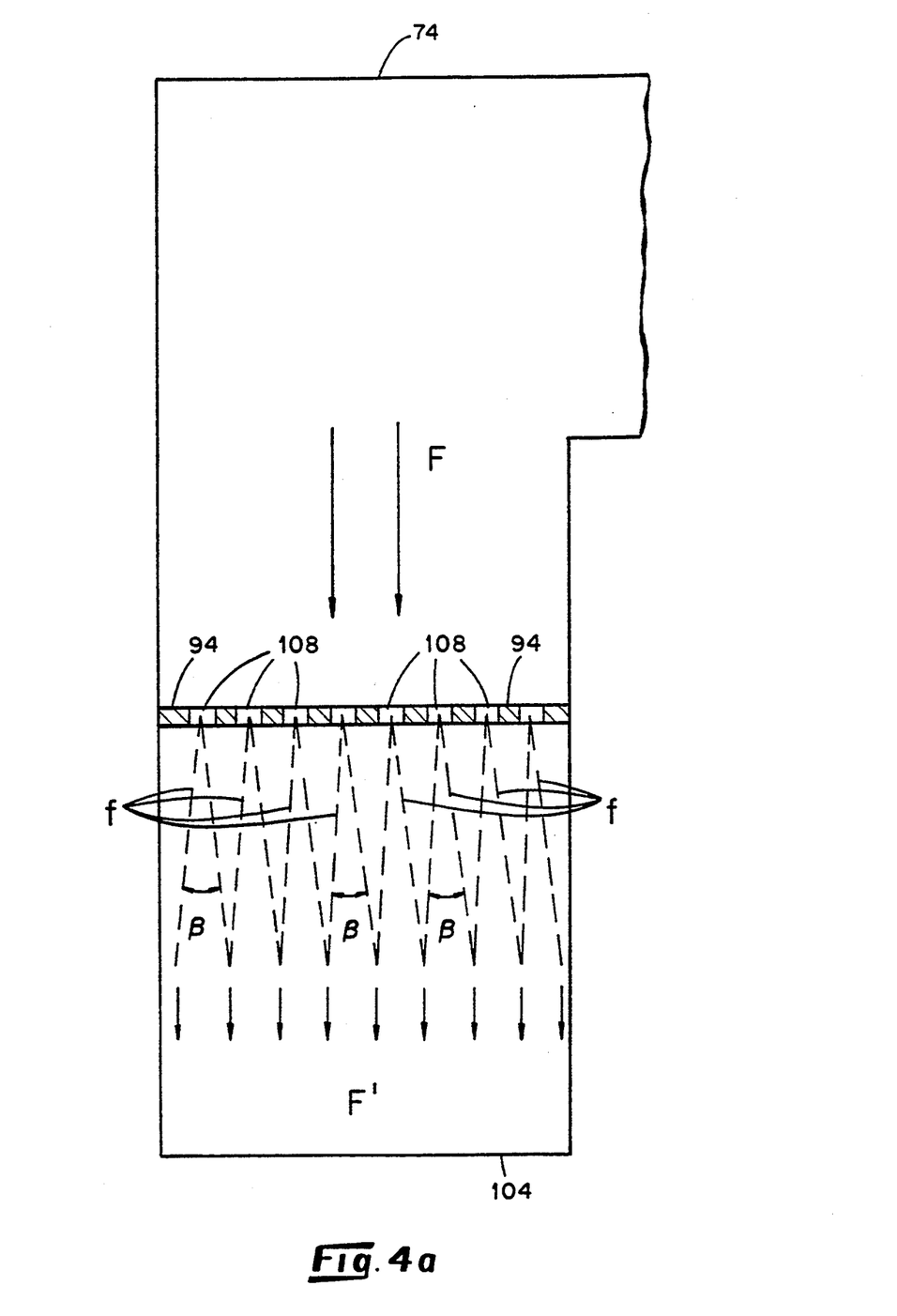
FIG. 4a is a detailed view showing diffusion of the flow into parallel flow streams which merge together as they approach the exit opening of the flow distributor.
Figure 5:
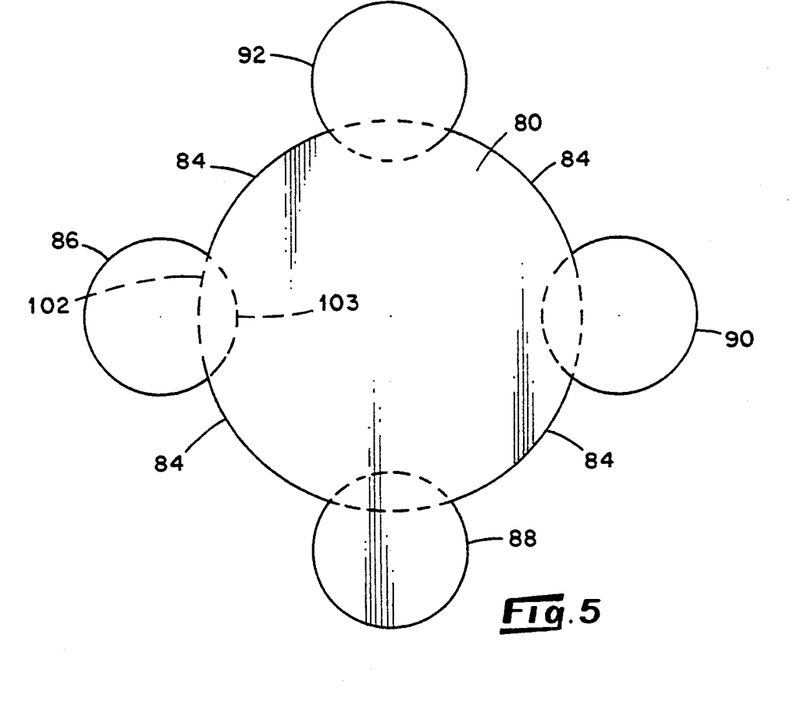
FIG. 5 is a top plan view of the apparatus of FIG. 3.
Figure 6:
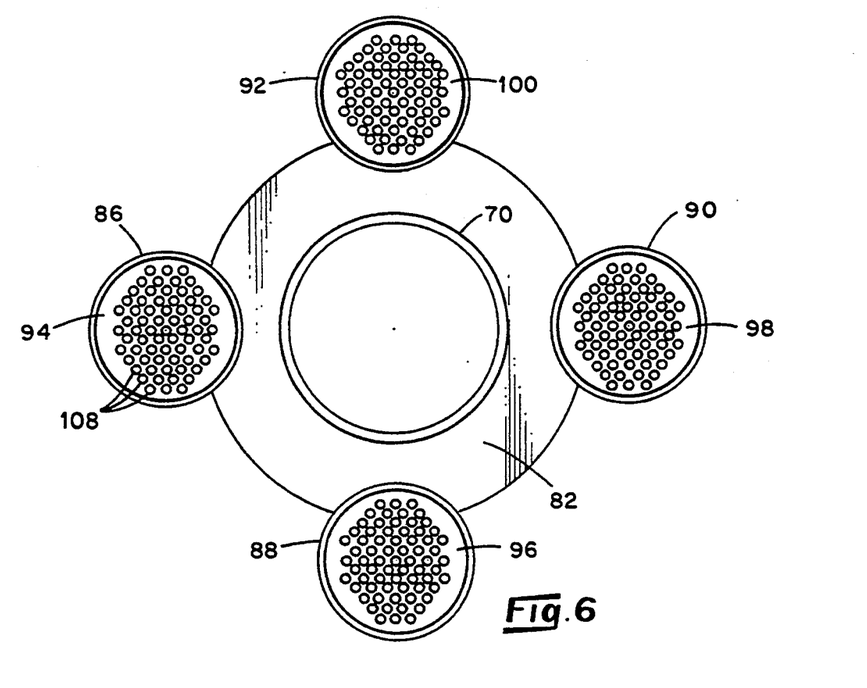
FIG. 6 is a bottom plan view of the apparatus of FIG. 3.

With additional reference to FIG. 4a, the openings 108, which are preferably circular, are configured and arranged to diffuse the flow of fluid F in the tube 86 upstream of the exit flow opening 104 to provide multiple, preferably regularly spaced apart, substantially parallel flow streams f which expand at an included angle $\beta$ of about 11° and merge together downstream of the grid plate 94 to establish a merged flow stream F' which, due to the spacing of plate 94 from the exit opening 104, extends substantially across the width of the tube before reaching the opening.

In this regard, it is noted that conventional shrouded gas distributors such as those described in the above-referenced U.S. Pat. No. 3,298,793 which attempt to reduce the velocity of the fluid jets entering the bed tend to create zones of negative pressure adjacent the exit opening of the shroud since, depending on the length of the tube, the flow may not be able to expand across the width of the tube before it exits. This typically arises when too short a tube is used. The presence of negative pressure zones in this region is detrimental because it tends to cause catalyst particles to be drawn into the outlet where they become entrained in the jet and propelled at great velocity against the wall of the shroud tube and into the particle bed itself. This causes the particles to hit against one another and fracture, and to strike against the interior of the tube which unduly accelerates erosion of the distributor and attrition of the bed. Accordingly, it will be appreciated that avoidance of negative pressure zones at the tube outlet according to the invention results in significantly lower particle attrition and reduces wear on the distributor.

It has also been observed that the acceleration of expansion of the flow provided by the distributor of the present invention using multiple smaller flow streams in each tube even further distributes the flow so that the fluid flows in a more uniform manner through the bed with considerably reduced likelihood of channeling in the bed. This is advantageous because uniform flow contacts a larger percentage of the catalyst particles than channeled flow and, thus, a higher conversion efficiency is achieved.

It is noted that in the illustrated embodiment, the distributor assemblies 12, 14 and 16 are arranged to cause flow steams emerging from their respective discharge tube arrays to be directed downwardly generally parallel to one another with substantially the same velocity and mass flow rate, and parallel to the direction of a gravity force acting upon the particles in the bed. Thus, the exit openings of the tubes face down and gravity-induced deposition of particles in the tubes is avoided. It will be appreciated that flow streams emerging from the tubes are initially directed downwardly, and then curve up along U-shaped flow paths to collectively elevate the particles above the tube arrays where the particles "float" in the gas in a conventional manner to provide the desired fluidized bed effect. However, it will be recognized that the invention is applicable to designs in which the gas flows upwardly directly into the bed or sideways in a manner which fluidizes the bed.

The gas distributor of the present invention is particularly well suited for small diameter reactors operating at relatively high velocities and reactors where the vertical distance between the floor of the reactor and the gas inlets is insufficient to accommodate conventional gas distributors. A particular advantage of the present invention is that it enables a more vertically compact distributor. For example, for a distributor of the present invention in which the tube 86 has a diameter of 3 inches and sixty-nine 5/64 inch circular openings 108 uniformly spaced 5/16 center-to-center apart in the grid plate 94 (total area of openings or orifice area=0.3308 inch), the minimum tube length $N_{min}$ necessary to expand the flow and create a merged flow stream extending across the width of the tube before discharge may be determined in accordance with the equation:

$$N_{min} = \frac{\text{Spacing between openings}}{\tan(5.5°)}$$
$$= (5/16)/\tan(5.5°) = 3.2 \text{ inch}$$

The value 5.5° results from our observation that gases expand at the included angle $\beta$ (see FIG. 4a) of about 11° at flow velocities typically used in fluidized bed reactors; e.g., in neighborhood of 120 ft/sec, and that the tube axis and the direction of gas leaving the orifice should be substantially coaxial. Once a minimum value has been determined, it is recommended to add an additional inch so that complete expansion of the merged flow stream across the width of the tube is insured. However, it is within the scope of the invention to use the minimum necessary tube length so long as there is substantially full expansion of the merged flow stream to the inside wall of the tube before discharge to minimize low pressure areas adjacent the exit opening of the tube.

It is a general rule of thumb that the pressure drop across a downwardly facing distributor should be at least about 10% of the pressure drop across the bed and the distributor pressure drop should be about 30% of the bed pressure drop for horizontal and upwardly facing distributors to insure proper distribution of the flow. It will be appreciated that this pressure drop is not always easy to achieve. The invention enables a higher pressure drop across the distributor for a given velocity so that the criteria for even distribution are more readily met.

Figure 8:
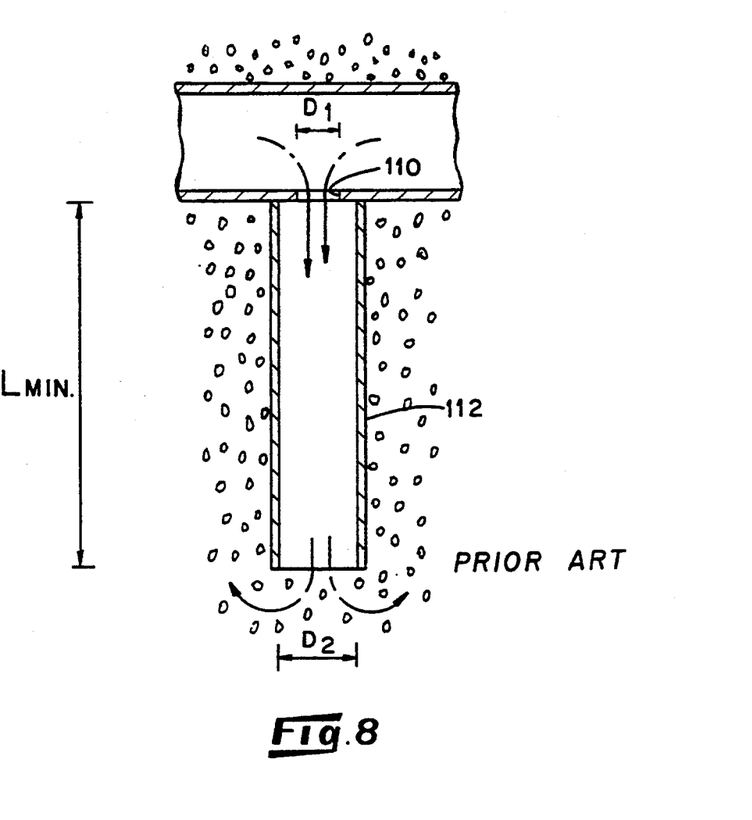
FIG. 8 is a cross-sectional view of a prior art gas distributor.

To further illustrate the advantages of the present invention, there is shown in FIG. 8 a prior art gas distributor having an orifice 110 and a diffusion tube 112. The diameter of the orifice is $D_1$ and the diameter of the tube is $D_2$. The minimum tube length ($L_{min}$) necessary to contain the flow and avoid severe erosion and attrition is a function of the diameter of the orifice and the tube and is determined in accordance with the equation:

$$L_{min} = \frac{1/2 (D2 - D1)}{\tan(5.5°)}$$

Thus, for a prior art distributor having an orifice diameter of 41/64 inch (0.3223 inch) and a 3 inch diameter tube, the minimum tube length would be:

$$L_{min} = \frac{1/2\,(3 - 41/64)}{\tan(5.5°)} = 12.3 \text{ inches}$$

This example confirms that the length of the discharge may be significantly reduced if the distributor is constructed in accordance with the present invention. Particularly, discharge tubes provided in accordance with the present invention are better suited for use in compact reactors whose size limitations prevent the use of conventional longer shrouds.

The foregoing description of a preferred embodiment of the present invention has been provided for purposes of illustration only, and it is understood that numerous modifications or alterations may be made without departing from the scope and spirit of the invention as defined in the following claims. Thus, it will be appreciated that the particular distributor configuration disclosed herein is only one of the many embodiments within the scope of the invention.

What is claimed is:

1. A flow distributor for distributing a flow of fluid to a bed of particles in a fluidized bed reactor which comprises a plurality of spaced apart elongate discharge conduits positioned adjacent one another within said reactor for distributing the flow of fluid into said bed of particles from a plurality of spaced apart locations spread generally across the width of the reactor, each of said conduits having an entrance open end and an exit open end and a substantially uniform cross-section between the entrance end and the exit end to promote a substantially linear flow path for fluid flowing from the entrance open end to the exit open end for delivering the flow of fluid from the conduit into the reactor from said spaced apart locations, discharge conduit support means located within said reactor for supporting said discharge conduits within said reactor at locations in the reactor adjacent one another, delivery means for delivering a flow of fluid to said discharge conduits from a fluid source outside of said reactor for being delivered to the reactor through said exit open ends of said conduits, and a grid plate supported in each of said conduits between the entrance end and the exit end, each of said grid plates having a plurality of substantially regularly spaced apart openings, each of said openings being defined by a surrounding wall with the wall of each opening being disposed substantially parallel to the walls of the other openings of the grid plate and to the length axis of its associated conduit, wherein the length of each conduit between the grid plate and the exit open end is no less than the center-to-center distance between adjacent openings of the grid plate therein divided by about 0.096, whereby the flow entering each conduit through the entrance open end is divided by passage through the grid plate into a plurality of regularly spaced apart, substantially parallel flow streams emanating from said openings in said grid plate and expanding from said openings at an included angle of about 11 degrees and wherein said plurality of substantially parallel flow streams merge together to provide a merged flow stream which extends substantially across the width of the conduit prior to discharge from the exit open end so that turbulence and creation of low pressure zones within the conduit are avoided and the length of the conduit may be reduced for a given flow velocity of fluid entering the conduit as compared to a conduit which does not contain said grid plate.

2. The flow distributor of claim 1, wherein said means for delivering comprises a plurality of spaced apart headers in flow communication with said fluid source with a plurality of said discharge conduits disposed on each of said headers in fluid flow communication therewith wherein each of said headers and its associated discharge conduits discharge fluid into the reactor with their exit openings lying generally in a plane extending across the vessel generally perpendicular to the flow of fluid through the bed of particles.

3. The flow distributor of claim 1, wherein said grid plates cause said merged flow steams to be discharged into the reactor at about the same velocity.

4. The flow distributor of claim 1, wherein said grid plates cause substantially all of said plurality of flow streams in each of said discharge conduits to merge together to provide said merged flow stream.

5. The flow distributor of claim 1, wherein said grid plates cause each of said plurality of regularly spaced apart, substantially parallel flow streams within a conduit to have about the same velocity.

6. The flow distributor of claim 1, wherein said discharge conduits are oriented to cause said merged flow streams discharging therefrom to be directed downwardly generally parallel to a gravity force acting on said particles to minimize gravity-induced deposition of particles in said conduits when flow is discontinued.

7. A fluidized bed reactor for contacting a flow of fluid from a fluid source with a bed of particles, said reactor comprising:
a reaction vessel;
a bed of particles in said reaction vessel;
means for discharging fluid from said reaction vessel;
means for connecting said vessel in flow communication with a fluid source located outside of said reactor vessel;
a plurality of discrete, elongate discharge conduits located positioned adjacent one another within said reaction vessel in flow communication with the fluid source through said means for connecting, discharge conduit support means located within said reactor for supporting said discharge conduits within said reactor at locations in the reactor adjacent to one another so that said discharge conduits are supported at locations within the reactor for distributing the flow of fluid into said bed of particles from a plurality of spaced apart locations spread generally across the width of the reactor in a plane generally perpendicular of the flow of fluid through the bed of particles, each of said conduits having an entrance open end and an exit open end and a substantially uniform cross-section between the entrance end and the exit end to promote a substantially linear flow path for fluid flowing from the entrance open end to the exit open end for delivering the flow of fluid from the conduit into said reaction vessel from said spaced apart locations directed from said openings generally coaxially with respect to the conduit; and
a grid plate supported in each of said conduits between the entrance end and the exit end, each of said grid plates having a plurality of substantially regularly spaced apart openings, each of said openings being defined by a surrounding wall with the wall of each opening being disposed substantially parallel to the walls of the other openings of the grid plate and to the length axis of its associated conduit, wherein the length of each conduit between the grid plate and the exit open end is no less than center-to-center distance between adjacent openings of the grid plate therein divided by about 0.096, whereby the flow entering each conduit through the entrance open end is divided by passage through the grid plate into a plurality of regularly spaced apart, substantially parallel flow streams emanating from said openings in said grid plate and expanding from said openings at an included angle of about 11 degrees and wherein said plurality of substantially parallel flow streams merge together to provide a merged flow stream which extends substantially across the width of the conduit prior to discharge from the exit open end so that turbulence and creation of low pressure zones within the conduit are avoided and the length of the conduit may be reduced for a given flow velocity of fluid entering the conduit as compared to a conduit which does not contain said grid plate.

8. The fluidized bed reactor of claim 7, wherein said means for connecting said vessel comprises a plurality of spaced apart headers in flow communication with said fluid source with a plurality of said discharge conduits disposed on each of said headers in fluid flow communication therewith wherein each of said headers and its associated discharge conduits discharge fluid into the reactor with their exit openings lying generally in a plane extending across the vessel generally perpendicular to the flow of fluid through the bed of particles.

9. A fluidized bed reactor for contacting a flow of fluid from a fluid source with a fluidizable bed of particles, the reactor comprising:

a reaction vessel having an interior cavity;

a bed of fluidizable particles located in said cavity of said reaction vessel;

a plurality of headers supported within said cavity of said reaction vessel;

means connecting said headers in fluid flow communication with the fluid source;

a plurality of flow distributors supported on each of said headers within said cavity of said reaction vessel, each of said flow distributors including a plenum in fluid flow communication with said header for delivering a flow of fluid into the distributor from the fluid source via the header and a plurality of elongate discharge conduits having a substantially uniform cross-sectional area between an entrance open end thereof and a discharge open end thereof, each of said conduits being in flow communication through its entrance open end with its associated plenum for delivering a flow of fluid from the source through said header and plenum into said cavity of said vessel from its discharge open end to impart a force upon the particles therein to fluidize the particles and establish a fluidized bed thereof;

discharge means in fluid flow communication with the cavity for discharging fluid from the cavity of said vessel so that fluid delivered into the cavity of the vessel from said conduits flows through the fluidized bed and out of the vessel through said discharge means;

a grid plate disposed in each of said conduits, each grid plate including a plurality of regularly spaced apart openings of substantially uniform dimension, said grid plate spanning the width of said conduit and being oriented substantially perpendicular to the length axis of the conduit, said grid plate being located between said entrance and discharge open end of said conduit and spaced from said discharge open end by no less than the spacing between adjacent openings divided by about 0.096, said grid openings being configured to generate within said discharge conduit from a single flow stream entering said conduit from said entrance open end a plurality of regularly spaced apart substantially parallel flow streams flowing toward said discharge open end from said grid plate wherein said flow streams emanate from said grid openings and expand from said openings at an included angle of about 11 degrees, whereby said flows streams emanating from said grid plates within said conduits merge together to provide a merged flow stream extending substantially across the width of the conduit prior to exiting said discharge open end so that low pressure areas within said conduit are avoided and the length of the conduit may be minimized as compared to a conduit not having a grid plate.

* * * * *